Feb. 5, 1957  E. MILYARD  2,780,125
COMBINATION METAL WORKING MACHINE
Filed Feb. 17, 1953  5 Sheets-Sheet 1
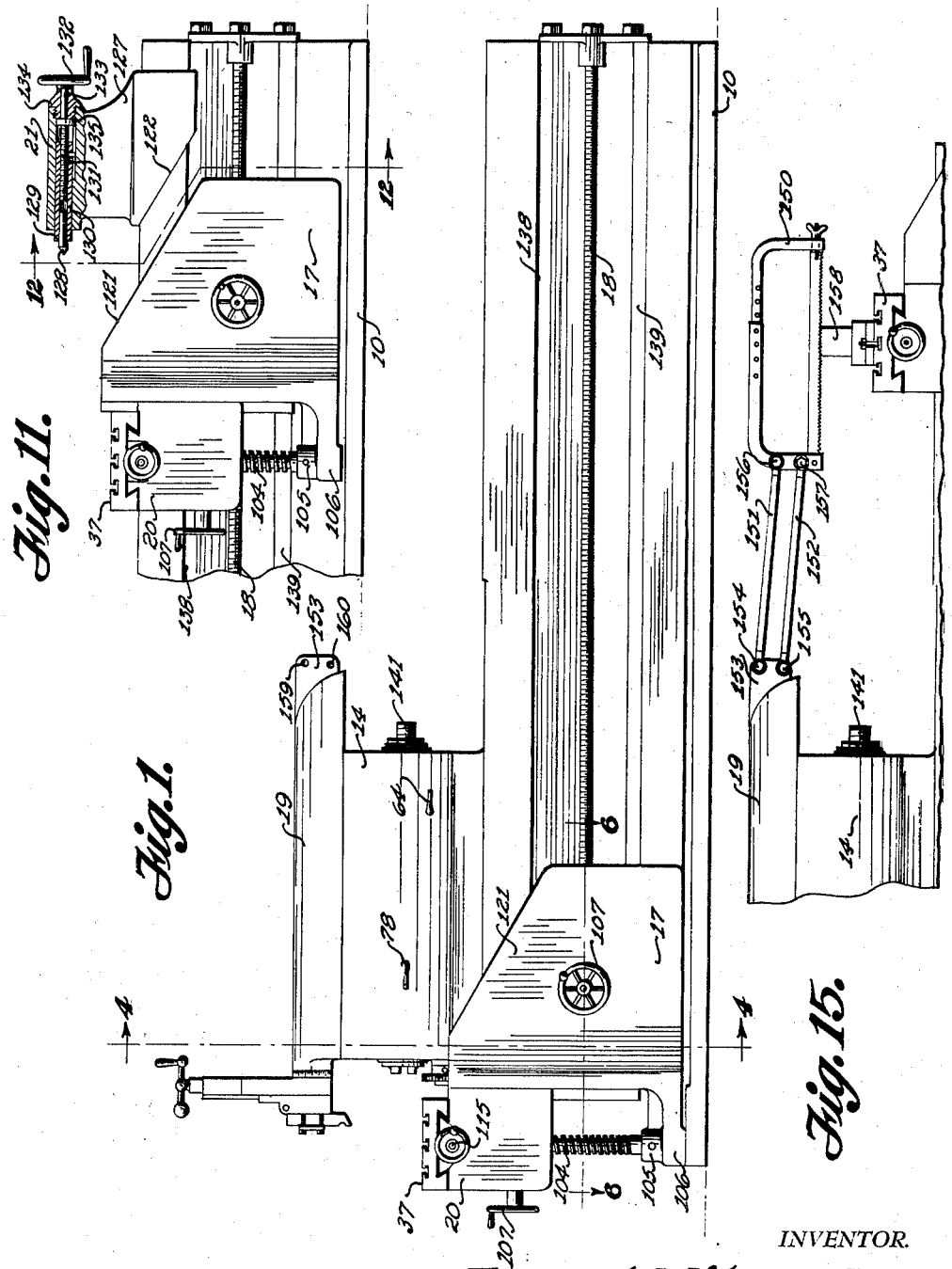
INVENTOR.
Emmert Milyard
BY Victor J. Evans & Co.
ATTORNEYS

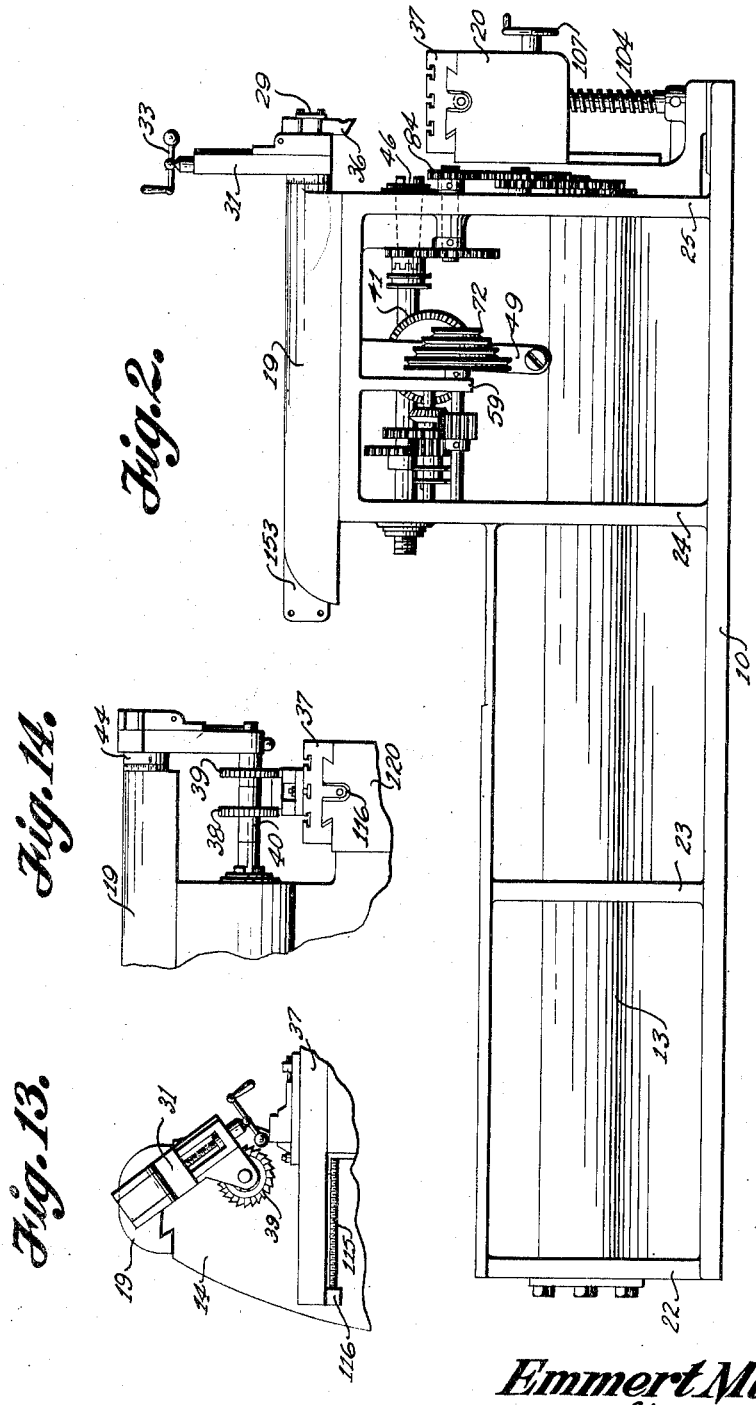

Feb. 5, 1957 E. MILYARD 2,780,125
COMBINATION METAL WORKING MACHINE
Filed Feb. 17, 1953 5 Sheets-Sheet 3
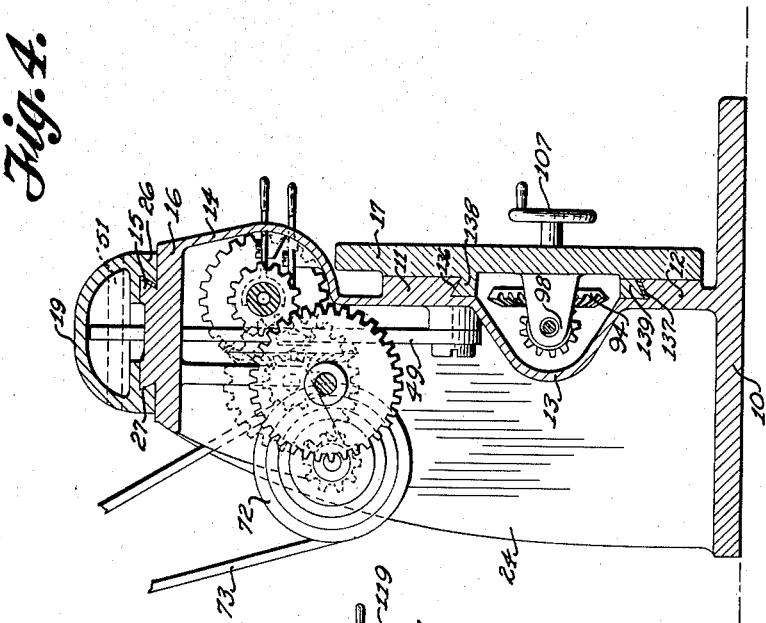
INVENTOR.
*Emmert Milyard*
BY *Victor J. Evans & Co.*
ATTORNEYS Feb. 5, 1957   E. MILYARD   2,780,125
COMBINATION METAL WORKING MACHINE
Filed Feb. 17, 1953   5 Sheets-Sheet 4
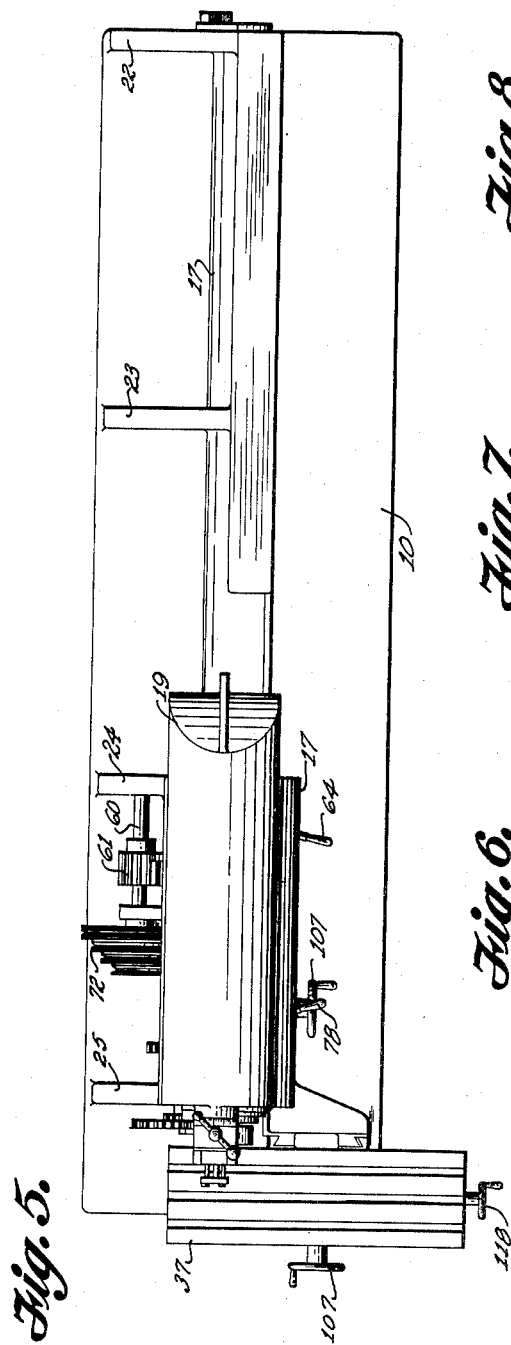
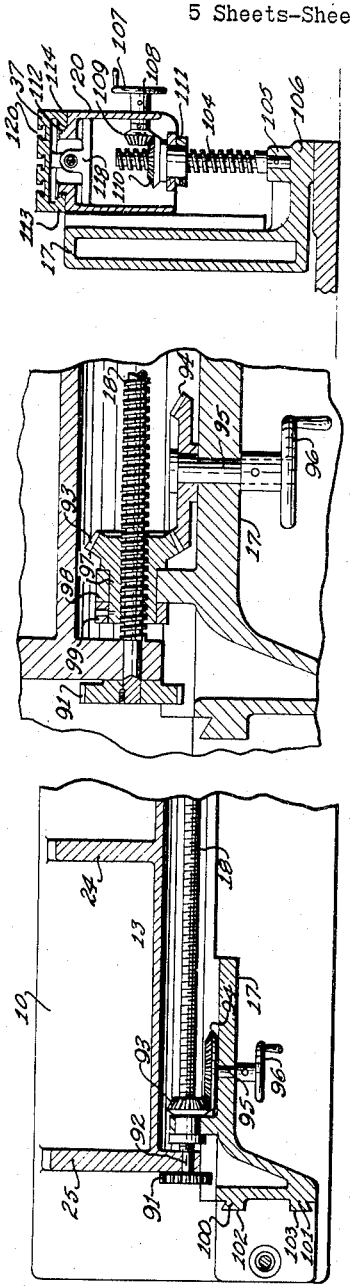
INVENTOR.
Emmert Milyard
BY Victor J. Evans & Co.
ATTORNEYS Feb. 5, 1957  E. MILYARD  2,780,125
COMBINATION METAL WORKING MACHINE
Filed Feb. 17, 1953  5 Sheets-Sheet 5
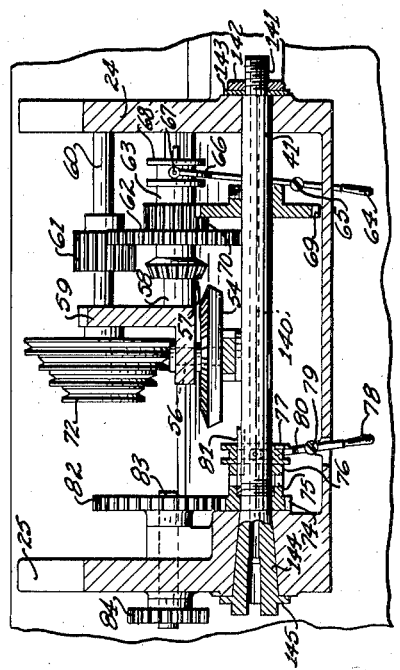
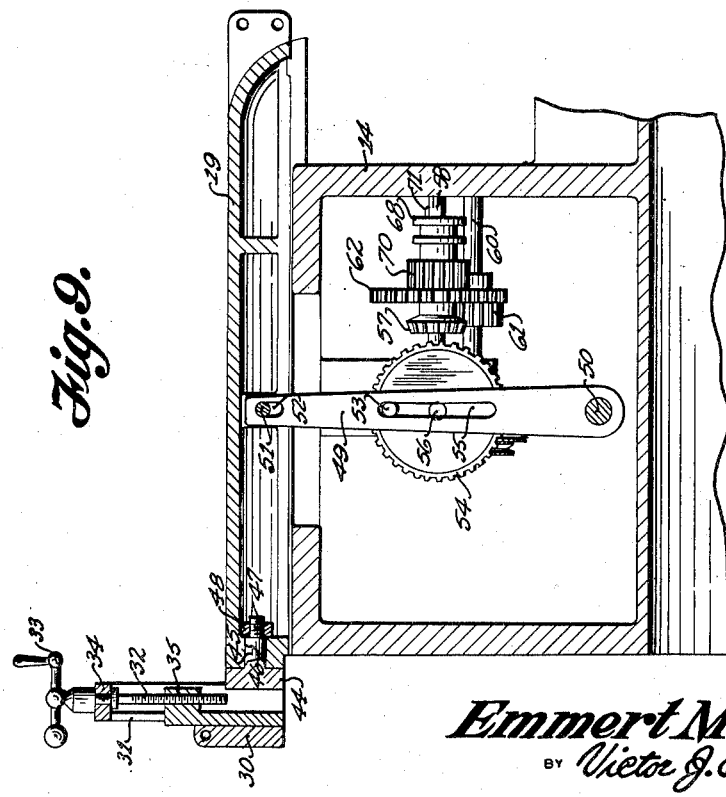
INVENTOR.
*Emmert Milyard*
BY *Victor J. Evans & Co.*
ATTORNEYS

United States Patent Office 2,780,125
Patented Feb. 5, 1957

2,780,125

COMBINATION METAL WORKING MACHINE

Emmert Milyard, Brookville, Ohio

Application February 17, 1953, Serial No. 337,266

2 Claims. (Cl. 82—21)

This invention relates to machine tools, and in particular a machine tool having elements for performing the operations of a milling machine, shaper, and lathe with the elements operated by a common power source and with the machine adapted to be readily converted from one operation to another.

The purpose of this invention is to provide a combination tool for use in an individual machine shop where space for a plurality of machine tools is not available.

Various types of machines have been provided with universal attachments for performing different operations, however, for general machine work it is desirable to combine these operations in a common tool having a frame or bed, a head, a knee and a carriage. With this thought in mind this invention contemplates an elongated frame having a feed screw with a carriage slidably mounted on the frame and adapted to be actuated by the feed screw, with a head adapted to provide a head stock at one end of the frame and a tail stock on the opposite end and a ram slidably mounted on the head and having means for holding and operating milling cutters and planing tools on one end thereof.

The object of this invention is to provide means for combining a plurality of machine tools in a single unit whereby different operations may be preformed on the tools and wherein each unit is operated by a common source of power.

Another object of the invention is to provide a combination of machine tools that may be converted from one tool to another by the average layman.

A further object of the invention is to provide a combination machine tool in which means is provided for varying the speed of the different elements and wherein one element may be operated without utilizing power for operating elements not in use.

A still further object of the invention is to provide a combination machine tool which is of a comparatively simple and economical construction.

With these and other objects and advantages in view the invention embodies an elongated main frame or bed having a carriage actuated by a feed screw slidably mounted on the main frame, a knee positioned at the end of the frame and adapted to be adjusted vertically, a head adapted to provide a headstock for a lathe and also adapted to carry a ram with milling machine cutters or with a planer tool carried thereby, and a tail stock removably mounted on the end of the frame opposite to that on which the head is positioned.

Other features and advantages of the invention will appear from the following description taken in connection with the drawings, wherein:

Figure 1 is a front elevational view of the combination machine tool.

Figure 2 is an elevational view looking toward the opposite side or back of the machine tool.

Figure 3 is an end elevational view of the machine tool looking toward the end on which the head, knee, and cross feed are positioned.

Figure 4 is a cross section through the machine taken on line 4—4 of Fig. 1.

Figure 5 is a plan view of the machine.

Figure 6 is a sectional plan taken on line 6—6 of Fig. 1 shown on an enlarged scale, and with the parts showing the manually actuated carriage feed.

Figure 7 is a detail also with the parts shown on an enlarged scale, showing a section similar to that shown in Fig. 6.

Figure 8 is a cross section through the knee of the machine taken on line 8—8 of Fig. 3, and showing means for adjusting the knee vertically.

Figure 9 is a longitudinal section through the head of the machine taken on line 9—9 of Fig. 3, and with the parts shown on an enlarged scale.

Figure 10 is a sectional plan through the head of the machine taken on line 10—10 of Fig. 3 and also with the parts shown on an enlarged scale.

Figure 11 is a front elevational view showing the end of the main frame or bed of the machine opposite to that on which the head is positioned, showing the carriage moved from the position shown in Fig. 1 to the opposite end of the bed and also showing a tail stock on the bed of the machine, the tail stock being shown in section.

Figure 12 is a cross section taken on line 12—12 of Fig. 11 through the end of the machine on which the tail stock is positioned.

Figure 13 is an elevational view looking toward the head of the machine showing a mounting for milling cutters in the head of the machine.

Figure 14 is a side elevational view also showing the milling cutters, as shown in Fig. 13.

Figure 15 is a detail illustrating a hack saw carried by the inner end of the ram mounted on the head of the machine.

Referring now to the drawings wherein like reference characters denote corresponding parts the combination machine tool of this invention includes a main frame or bed having a base 10 with a vertically disposed bed or support member having an upper substantially L-shaped rail 11, a lower rail 12, an arcuate intermediate or connecting section 13, a head 14 having a rail 15 extended from the upper surface of an upper plate 16, a carriage 17 slidably mounted on the bed and actuated by a feed screw 18, a ram 19 slidably mounted on the head, a knee 20 slidably mounted on the end of the carriage, and a tail stock 21.

The vertically disposed bed of the main frame is supported from the base 10 with spaced webs 22, 23, 24, and 25 and, as shown particularly in Fig. 2, the head extends between the webs 24 and 25, and the L-shaped portion of the upper rail 11 extends between the webs 24 and 25.

The base 26 of the ram 19 is provided with a dove-tail slot 27 that receives the rail or tongue 15 of the upper plate 16 and a friction take-up grip 28 is provided in one side of the slot. The head of the ram is provided with a tool holder 29 that is carried by a hinge plate 30 on a vertically slidable carrier 31 that is actuated with a feed screw 32 which is rotated by a hand crank 33. The feed screw 32 is journaled in a cross bar 34 of the carrier 31 and threaded in a bearing 35 of the head of the ram. By this means a cutting tool, as indicated by the numeral 36 is adapted to be positioned to be used as a sharper or, with the tool turned to an angle of 90 degrees, as a planer.

With work clamped to the transversely sliding table 37 it may be positioned to be worked on by a tool in the head of the ram, or by milling cutters, such as the cutters 38 and 39 shown in Figs. 13 and 14 wherein the cutters are mounted on an extension shaft 40 extending from the head spindle 41 of the machine. For this use the head 31 is turned to the position shown in Fig. 13 whereby an opening 42 in an arm 43 thereof is positioned over the extension 40. For this use the ram head is provided with a hub 44 from which a pin 45 extends and, as shown in Fig. 9, the pin 45 extends through an opening 46 in the end of the ram. The pin 46 is provided with a threaded stud 47 on which a nut 48 is positioned. It will be understood that tools and the like may be clamped in the head of the ram by other suitable means.

The ram is slidably mounted on the head 14 of the machine with the dove-tail tongue 15 and slot 27 and the ram is reciprocated by an arm 49 which is pivotally mounted on a shaft 50 in the lower part of the head of the machine. The upper end of the arm is pivotally connected by a pin 51 to the ram 19, and the pin 51 is extended through an elongated slot 52 in the arm.

The arm 49 that reciprocates the ram 19 is actuated by an eccentrically positioned pin 53 that extends from a gear 54 into a slot 55 in the arm and, as illustrated in Fig. 10, the gear 54, which is journaled on a stub shaft 56 is actuated by a beveled pinion 57 that is slidably mounted on a shaft 58.

The shaft 58 is journaled in the web 24, at one end and, at the opposite end, in a bracket 59 and this shaft is driven from a countershaft 60 by gears 61 and 62. The gears 57 and 62 are mounted on a hub 63 that is slidably mounted on the shaft 58 and the hub 63 is actuated by a hand lever 64 that is pivotally mounted in the head of the machine by a pin 65 and that is provided with a yoke 66, pins 67 in the arms of which extend between flanges of a clutch collar 68. As the clutch collar is actuated by the hand lever 64 the gear 62 slides in the gear 61 and the pinion 57 meshes with the gear 54. In this movement a gear 69 on the head spindle 41 slides in a gear 70 on the hub 63 and as the pinion 57 meshes with the gear 54 the gear 70 leaves the gear 69 whereby the drive of the head spindle is disconnected. It will be understood, therefore, that as the ram is reciprocating, the head spindle or lathe portion of the machine is inactive. The hub 63 is keyed to the shaft 58 with a key 71.

The shaft 60 is provided with a cone pulley 72 which provides operating means for the machine, the cone pulley being driven by a belt 73 that may extend to a pulley on a main or countershaft or directly to the pulley of a motor.

The head spindle 41 is also provided with a gear 74 which is freely mounted on the shaft and the gear is provided with a clutch element 75 that is positioned to mesh with a complementary clutch element 76 carried by a clutch collar 77 and the clutch collar and element 76 are actuated by a hand lever 78 that is pivotally mounted on a pin 79 and that is provided with a yoke 80 that straddles the clutch collar 77 whereby, with the clutch collar keyed on the spindle 41 with a key 81 the clutch element 76 is engaged with or disengaged from the clutch element 75. The gear 74 meshes with a gear 82 on a shaft 83, which is journaled in the web 25 of the main frame of the machine and a pinion 84 on the outer end of the shaft meshes with a gear 85 on a shaft 86 on which is a pinion 87 that meshes with a gear 88 on a shaft 89. The shaft 89 is also provided with a pinion 90 that meshes with a gear 91 on a pin 92 that extends from the end of the feed screw 18, of the lathe portion of the machine. By this means the feed screw is actuated at reduced speeds from the head spindle of the machine and the revolutions of the feed screw are adapted to be changed by changing the gears of the gear train between the head spindle and screw.

The feed screw 18 is also provided with a beveled pinion 93 that meshes with a beveled gear 94 on a shaft 95 that is journaled in the carriage 17 and by rotating the gear 94 with the hand wheel 96 on the end of the shaft 95 the carriage is actuated manually. The bevel gear 93 is provided with a hub 97 and, as shown in Fig. 7, the hub is journaled in a bearing 98 extended from the carriage 17 whereby the pinion 93 travels with the carriage. A set collar 99 is provided on the end of the hub 97 to retain the hub in the bearing.

One end of the carriage 17 is provided with dove-tail tongues 100 and 101 which extend into grooves 102 and 103, respectively of the knee 20 providing means for slidably mounting the knee on the carriage and, as illustrated in Fig. 8 the knee is actuated vertically with a feed screw 104 that is journaled in a bearing 105 in a finger 106 at the lower end of the carriage and the position of the knee on the feed screw is adjusted by a hand wheel 107 on a shaft 108 on the inner end of which is a bevel gear 109 which meshes with a similar bevel gear 110 that is threaded on the feed screw 104 and that is journaled in a bearing 111 in the lower part of the knee.

The transverse table 37 of the knee is slidably mounted on a dove-tail tongue 112 with flanges 113 and 114 and the table is actuated longitudinally with a feed screw 115 that is journaled in bearings 116 and 117 at the ends of the table 37 and that is threaded into a projection 118 which extends upwardly from the knee 20. The end of the feed screw 115 is provided with a hand wheel 119 by which the screw 115 is manually actuated and the upper surface of the table 37 is provided with dove-tail grooves 120.

The carriage 17 is formed substantially as shown in Figs. 1 and 4 and the upper surface is provided with an inclined edge 121 to provide clearance for a corresponding surface 122 of a front plate 123 of the tail stock 21. The tail stock is also provided with an upper plate 124 and flanges 125 and 126 on the edges of the plates 123 and 124, respectively, retain the tail stock in sliding relation with the upper rail 11 of the bed of the main frame.

The cylindrical section of the tail stock 21 is supported above the base or plate 124 with a standard 127 and, as shown in Fig. 11 the tail stock is provided with a center 128 that is mounted in a collet 129 forming the spindle of the tail stock. The spindle is actuated in a bore 130 of the tail stock by a screw 131 which is rotated by a hand wheel 132. The screw is provided with a stem 133 that is journaled in a bushing 134 and the screw is held in position with a collar 135.

The tail stock may be of other suitable designs and it will be understood that the tail stock, carriage, ram and knee may be provided with suitable means whereby the parts are adapted to be clamped to the main frame or bed of the machine.

The inner opposed faces of the rails 11 and 12 of the vertically disposed bed of the main frame of the machine are beveled providing beveled surfaces 136 and 137 and these surfaces coact with corresponding surfaces of tongues 138 and 139, respectively extended from the wall or main plate of the carriage 17 whereby the carriage is free to slide longitudinally of the main frame and particularly from the position shown in Fig. 1 to that shown in Fig. 11. In this movement the table 37 of the knee 20 is extended from the knee with the end on which the bearing 116 is positioned adapted to pass over the upper edge of the rail 11 of the bed of the machine.

The head spindle 41 of the machine is provided with a continuous bore 140 and a work holding chuck may be mounted on a threaded end 141 whereby work mounted on the end of the spindle is positioned to be held in position by the center 128 of the tail stock. The end of the spindle may be provided with a nut 142 and a washer 143.

The opposite end of the spindle 41 is provided with a tapering section 144 which is preferably split and being mounted in a tapering opening is adapted to be drawn inwardly by the nut 142 for clamping a pin or shaft therein. The section 144 is provided with a collar 145 and a slot 146 extends through the extended end.

With these elements assembled on a common base or main frame as disclosed and described various other types of tools may be used in combination, such as the metal saw 150 illustrated in Fig. 15 wherein the saw frame is carried by parallel bars 151 and 152 with the bars pivotally mounted on a web 153 extending from the ram 19 with bolts 154 and 155. The opposite ends of the bars 151 and 152 are secured with bolts 156 and 157 to the saw frame. With work, as indicated by the numeral 158 mounted on the table 37 the work is readily adjustable in relation to the saw or other tool and various operations may be performed on the work. The bolts 154 and 155 extend through openings 159 and 160 in the web 153 and different types of tools may be bolted or otherwise secured to the ram through the openings.

In operation, work or other machines or equipment may be positioned between the spindle 41 and the tail stock so that the device may be used as a lathe and work positioned on the table 37 may be planed, milled, or cut with a shaper action.

It will be understood that modifications, within the scope of the appended claims, may be made in the design and arrangement of the parts without departing from the spirit of the invention.

What is claimed is:

1. A machine tool comprising a main frame embodying a base, a vertically disposed bed extending upwardly from said base and including an upper and lower rail, an intermediate section connecting said upper and lower rails together, a head extending upwardly from said upper rail and including an upper plate having a rail thereon, a carriage slidably mounted on said frame, a feed screw for actuating said carriage, a ram slidably mounted on said head, a knee slidably mounted on an end of said carriage, a plurality of webs for supporting said bed, said ram including a base provided with a dovetail slot for slidably engaging the rail on said upper plate, a friction take-up grip positioned at one end of said slot, a vertically slidable carrier connected to said ram, a hinge plate on said carrier, a tool holder carried by said hinge plate, a feed screw for actuating said carrier, a transversely sliding table supported above said knee, an arm having its upper end pivotally connected to said ram for reciprocating said ram, a gear arranged contiguous to said arm, an eccentric pin projecting from said gear and connected to said arm, a drive shaft arranged at right angles with respect to said gear, a pinion slidably mounted on said shaft and mounted for movement into and out of engagement with said gear, said shaft being journaled in one of said webs, a countershaft arranged in spaced parallel relation with respect to said drive shaft, gear means connecting said countershaft to said drive shaft, a hand lever for controlling said gear means, a cone pulley mounted on an end of said countershaft and adapted to be connected to a power source, manually operable gear means connecting said feed screw to said carriage, and manually operable screw means for adjusting said knee vertically.

2. In a machine tool, a horizontally disposed base, a vertically disposed support member extending upwardly from said base and including an upper horizontally disposed rail and a lower horizontally disposed rail, an arcuate intermediate section interconnecting said upper and lower rails together, a head extending upwardly from said support member and including an upper horizontally disposed plate, said head being curved and extending in the opposite direction from said arcuate section, a carriage slidably mounted on the rails of said support member, a horizontally disposed feed screw supported above said base for actuating said carriage, a vertically shiftable knee slidably mounted on an end of said carriage, a plurality of webs arranged in spaced apart relation with respect to each other, two of said webs being of increased height for supporting said head, a pair of spaced parallel vertically disposed tongues on an end of said carriage, said knee being provided with a pair of spaced parallel grooves for slidably receiving said tongues, a finger extending from the lower end of said carriage, a vertically disposed feed screw extending upwardly from said finger and engaging said knee, a feed screw for acuating said table, said carriage being provided with an upper inclined edge, said carriage being provided with beveled surfaces for slidably coacting with and engaging beveled surfaces on the rails of said support member.

References Cited in the file of this patent

UNITED STATES PATENTS

| 73,027 | Munger | Jan. 7, 1868 |
| 649,309 | Hungerford | May 8, 1900 |
| 1,144,744 | Wheeler | June 29, 1915 |
| 1,647,368 | Lovely | Nov. 1, 1927 |

FOREIGN PATENTS

| 43,585 | Sweden | Jan. 13, 1917 |
| 219,921 | Great Britain | Oct. 30, 1924 |
| 352,344 | France | Mar. 13, 1905 |